US012683209B2

(12) United States Patent
Sakata et al.

(10) Patent No.: US 12,683,209 B2
(45) Date of Patent: Jul. 14, 2026

(54) BATTERY TREATMENT METHOD

(71) Applicant: HONDA MOTOR CO., LTD., Tokyo (JP)

(72) Inventors: Takayuki Sakata, Wako (JP); Yushi Fujinaga, Wako (JP); Mitsumasa Sorazawa, Wako (JP); Hideki Matsuda, Wako (JP); Satoru Takahashi, Wako (JP); Ryo Shimizu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 104 days.

(21) Appl. No.: 18/436,405

(22) Filed: Feb. 8, 2024

(65) Prior Publication Data

US 2024/0332658 A1    Oct. 3, 2024

(30) Foreign Application Priority Data

Mar. 28, 2023    (JP) ................................. 2023-052017

(51) Int. Cl.
*H01M 10/54*        (2006.01)
*C22B 1/00*        (2006.01)

(52) U.S. Cl.
CPC ............. *H01M 10/54* (2013.01); *C22B 1/005* (2013.01)

(58) Field of Classification Search
None
See application file for complete search history.

(56) References Cited

U.S. PATENT DOCUMENTS

2001/0008723 A1*    7/2001    Kawakami ............ H01M 10/54
                                                                          429/49

FOREIGN PATENT DOCUMENTS

JP        2020194749 A    *    12/2020
JP            7120158 B2        8/2022

OTHER PUBLICATIONS

Machine Translation of JP-2020194749-A.*
Tokoro et al. Separation of cathode particles and aluminum current foil in Lithium-Ion batter by high voltage pulsed discharge Part I. Waste Management (125, p. 58-66). Mar. 5, 2021. Retrieved online at: https://www.sciencedirect.com/science/article/pii/S0956053X21000131 (Year: 2021).*

* cited by examiner

*Primary Examiner* — Christopher T Schatz
(74) *Attorney, Agent, or Firm* — Rankin, Hill & Clark LLP

(57)        ABSTRACT

A method of treating a battery having a laminated electrode that includes a positive electrode plate and a negative electrode plate with a separator interposed between the positive electrode plate and the negative electrode plate, the battery being either a lithium ion battery or a solid-state battery, includes: an immersion step of immersing the laminated electrode in water after lithium is deactivated; and a separation step of separating the laminated electrode by applying an electrical pulse to the laminated electrode.

2 Claims, 6 Drawing Sheets

ELECTRICAL
PULSE
APPLICATION
DEVICE

BATTERY TREATMENT METHOD

INCORPORATION BY REFERENCE

The present application claims priority under 35 U.S.C. § 119 to Japanese Patent Application No. 2023-052017 filed on Mar. 28, 2023. The content of the application is incorporated herein by reference in its entirety.

BACKGROUND OF THE INVENTION

Field of the Invention

The present invention relates to a battery treatment method.

Description of the Related Art

Some of lithium ion batteries and solid-state batteries have a laminated electrode that includes a positive electrode plate and a negative electrode plate laminated with a separator interposed therebetween. Batteries of this type have a positive electrode composite containing a ternary positive electrode material, which contains nickel, cobalt, and manganese (NCM). It is desired to recover valuable metals such as NCM from the batteries at the time of disposal.

A method of crushing the batteries to recover the valuable metals is laborious and time consuming because it involves granulation of the dismantled batteries. A method other than the crushing method has been proposed (for example, Japanese Patent No. 7120158), which includes removing an outer cover composed of a laminate film and subsequently immersing a laminated electrode in water to cause relative movement between the laminated electrode and the water, thereby bringing a positive electrode plate and a negative electrode plate into a separated state.

However, the separation method involving the relative movement is time consuming. In addition, some parts may remain not separated depending on the orientation or the like of a work in the water.

An object of the present invention, which has been made in view of the above circumstances, is to separate a laminated electrode simply and in a short time.

SUMMARY OF THE INVENTION

A method of treating a battery is provided, the battery having a laminated electrode that includes a positive electrode plate and a negative electrode plate with a separator interposed between the positive electrode plate and the negative electrode plate, the battery being either a lithium ion battery or a solid-state battery, the method including: an immersion step of immersing the laminated electrode in water after lithium is deactivated; and a separation step of separating the laminated electrode by applying an electrical pulse to the laminated electrode.

Advantageous Effect of Invention

The laminated electrode can be separated simply and in a short time.

BRIEF DESCRIPTION OF THE DRAWINGS

FIG. 4 is a diagram for explanation of a separation step;

FIG. 5 is a diagram schematically illustrating a state where an electrical pulse is applied in the separation step.

DETAILED DESCRIPTION OF THE PREFERRED EMBODIMENT

An embodiment of the present invention will be described below with reference to the drawings.

Embodiment

Figure 1:
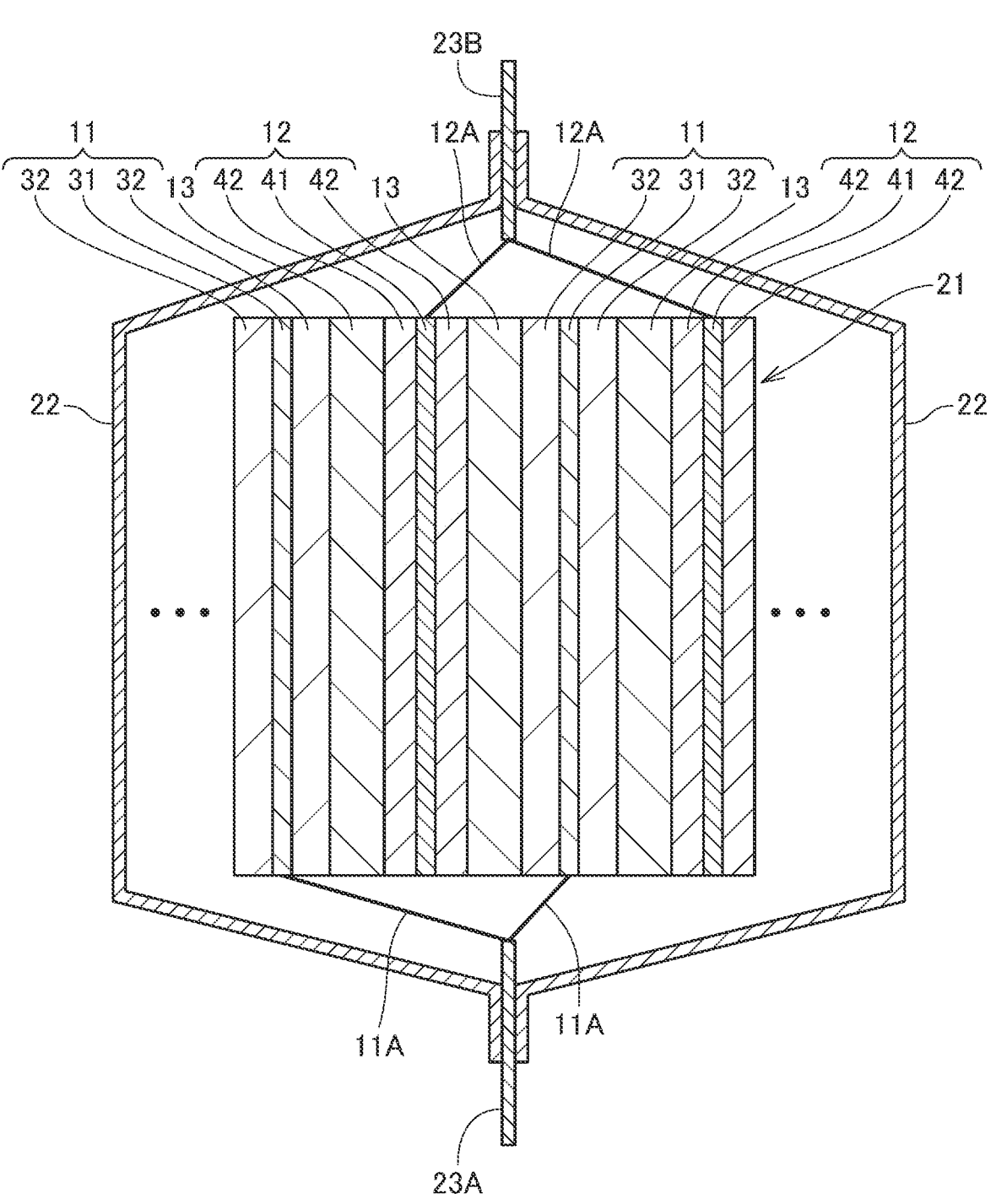
FIG. 1 is a diagram schematically illustrating a target battery to which a battery treatment method according to the present invention can be applied.

FIG. 1 is a diagram schematically illustrating a battery to which the battery treatment method according to the present invention can be applied (hereinafter referred to as a target battery).

A target battery 10 is a laminated secondary battery such as a lithium ion battery or a solid-state battery.

The target battery 10 has a multi-layer laminated electrode 21 including positive electrode plates 11 and negative electrode plates 12 laminated with separators 13 interposed therebetween. The laminated electrode 21 is covered with laminate materials 22 serving as an outer cover, and a pair of current collector tabs 23A and 23B is exposed outside of the laminate materials 22.

The target battery 10 can be referred to as a pouch battery, a laminated battery cell, a pouch battery cell, a lithium ion battery cell, a battery module, or the like.

The target battery 10 has attracted attention as an electric storage device of high energy density, and hence is predicted to be widespread more in the future. In addition, since the target battery 10 includes valuable metals such as a ternary positive electrode material, which contains nickel, cobalt, and manganese (NCM), it is desired to recover the valuable metals or the like from the battery at the time of disposal.

The configuration of the target battery 10 will be further described.

As illustrated in FIG. 1, the positive electrode plates 11 and the negative electrode plates 12 are alternately disposed, in which a plurality of pairs of electrode plate groups are provided, each pair including the positive electrode plate 11 and the negative electrode plate 12.

Each positive electrode plate 11 has a positive electrode current collector 31 having a shape of a rectangular plate, and the positive electrode current collector 31 is provided with positive electrode composites 32 containing NCM on the both surfaces. The positive electrode current collector 31 is, for example, aluminum foil or an aluminum plate. The positive electrode composite 32 contains, for example, a positive electrode active material such as lithium nickel oxide and lithium cobalt oxide, a conductive material, a binder, and the like. A positive electrode terminal 11A extends from each positive electrode plate 11, and the respective positive electrode terminals 11A are connected to the positive electrode side current collector tab 23A.

Each negative electrode plate 12 has a negative electrode current collector 41 having a shape of a rectangular plate, and is provided with a negative electrode composite 42 on the surface facing the positive electrode plate 11. A negative electrode terminal 12A extends from each negative electrode plate 12, and the respective negative electrode terminal 12A are connected to the negative electrode side current collector tab 23B.

The pair of current collector tabs 23A and 23B is made of thin-plate metal material such as copper or aluminum, and is exposed outside through a gap between the two laminate materials 22 serving as an outer cover.

The laminate materials 22 are laminate films containing a metal material such as an aluminum alloy or stainless steel as a base material, and function as an outer cover having a certain strength and as a sealing body for sealing the laminated electrode 21.

The separator 13 is disposed between the positive electrode plate 11 and the negative electrode plate 12, and prevents short circuit between the positive electrode plate 11 and the negative electrode plate 12. In the case where the target battery 10 is a lithium ion battery, the inside of the target battery 10, that is, the inside of the laminate materials 22 is filled with an electrolyte solution.

In contrast, in the case where the target battery 10 is a solid-state battery, the inside of the laminate materials 22 does not include an electrolyte solution, and a solid electrolyte is provided between the positive electrode plate 11 and the negative electrode plate 12. The solid electrolyte also serves as the separator 13.

Examples of the electrolyte used for the electrolyte solution and the solid electrolyte include lithium salt compounds such as lithium hexafluorophosphate ($LiPF_6$). Note that the configuration of each component of the target battery 10 is not limited to the above-described configuration, and configuration of conventional laminated batteries can be employed.

Next, a method of treating the target battery 10 preferable for taking out valuable metals such as NCM will be described.

Figure 2:
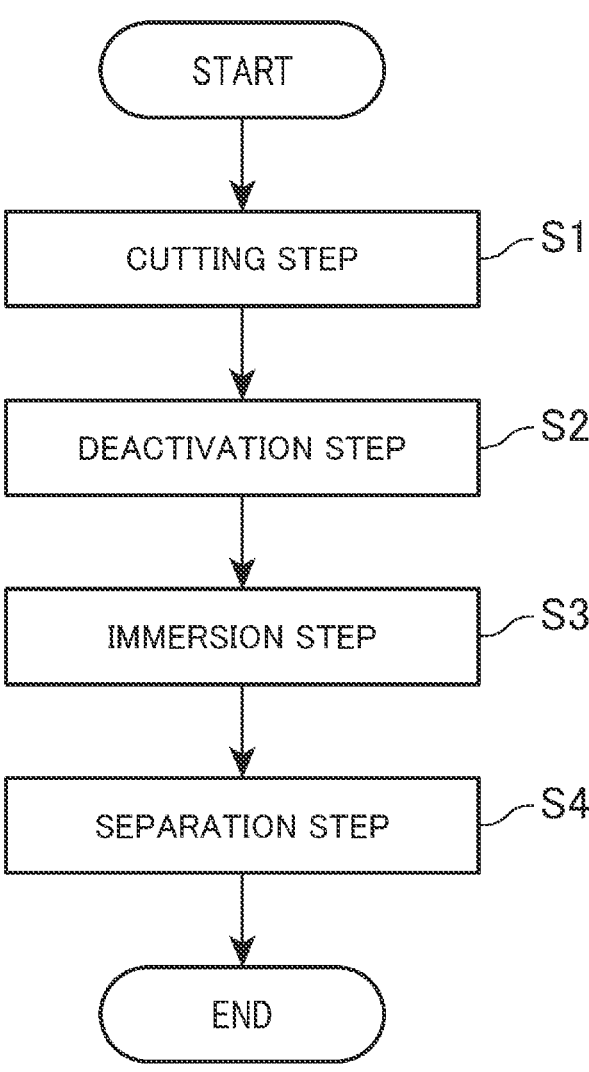
FIG. 2 is a flowchart showing respective steps of the method of treating the target battery.
Figure 3:
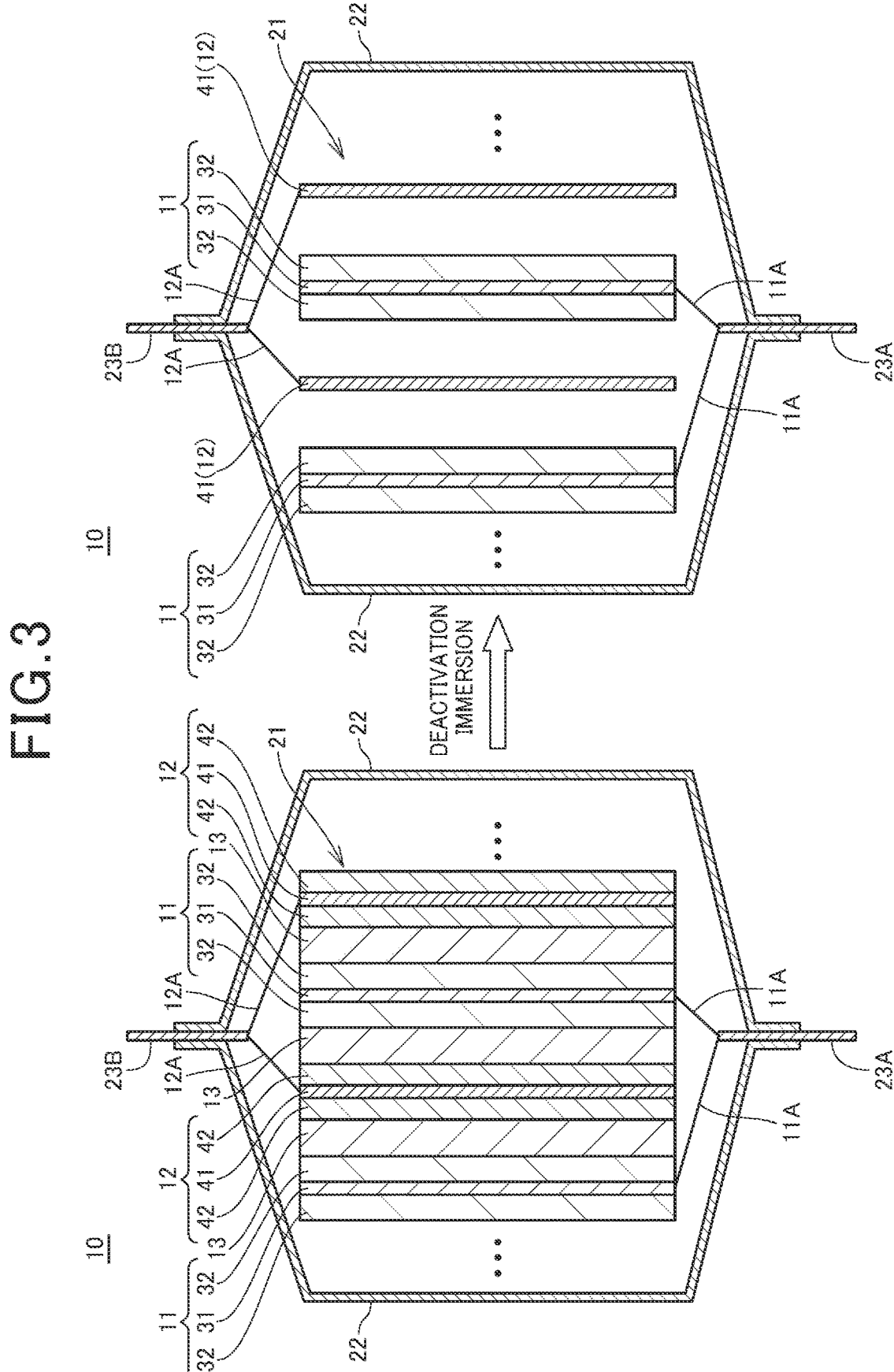
FIG. 3 is a diagram schematically illustrating the states before and after deactivation and immersion steps in a case where the target battery is a solid-state battery.
Figure 4:
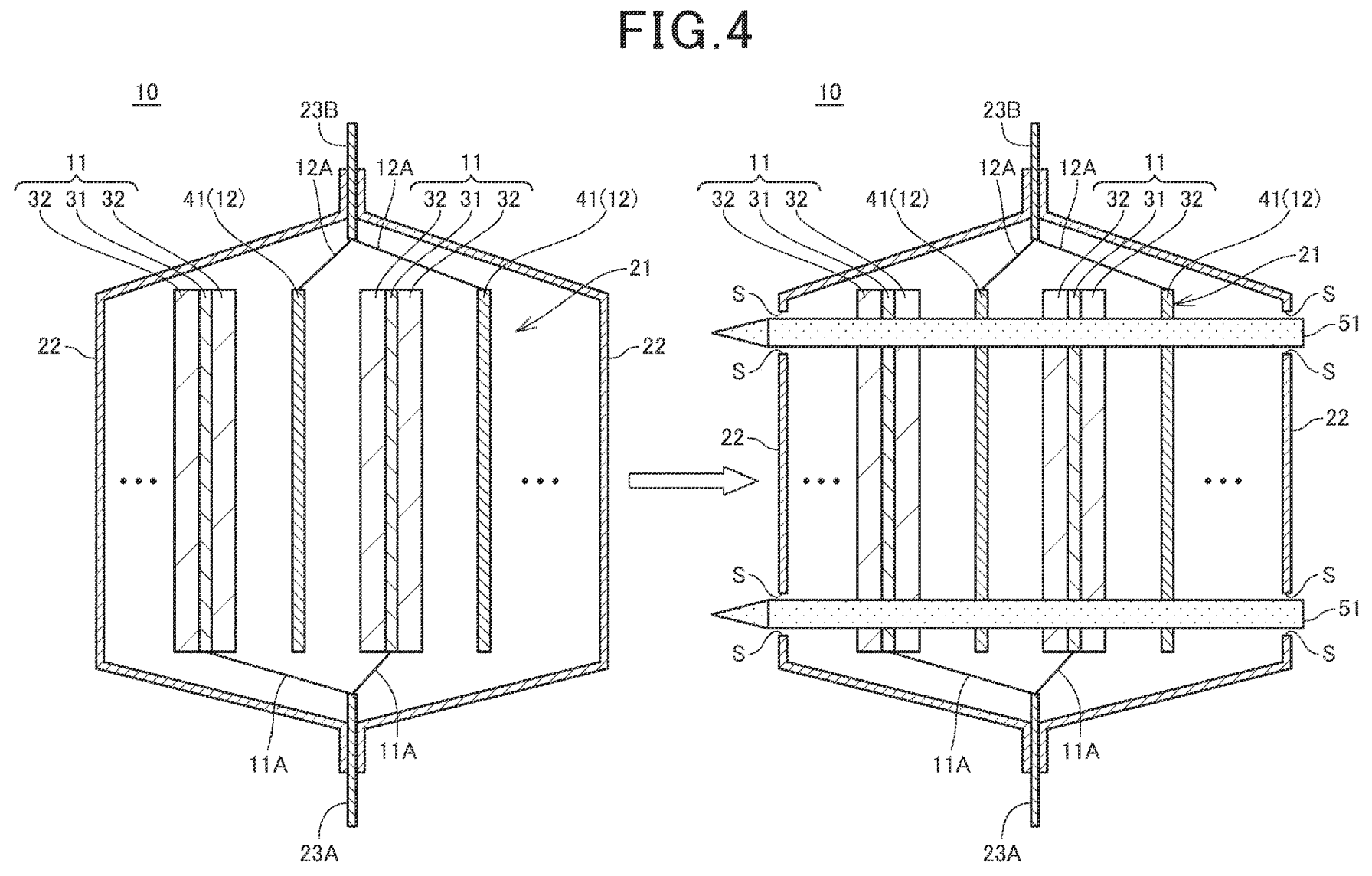
Figure 5:
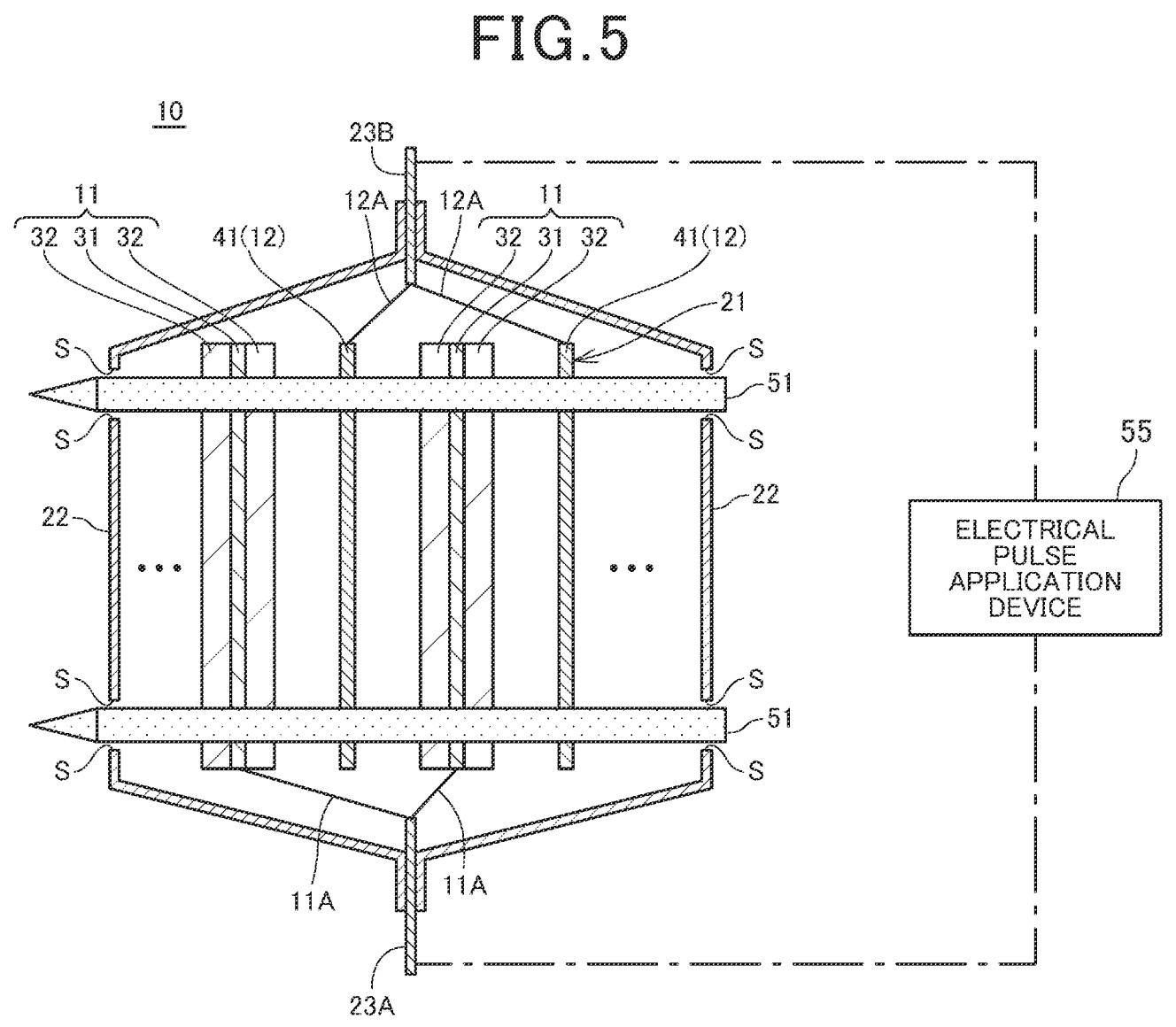

FIG. 2 is a flowchart showing respective steps of the method of treating the target battery 10. FIGS. 3 to 5 are diagrams schematically illustrating the states in the respective steps.

As shown in FIG. 2, the method of treating the target battery 10 includes a cutting step S1, a deactivation step S2, an immersion step S3, and a separation step S4.

In the cutting step S1, the laminate materials 22 serving as an outer cover are partially cut, which allows the laminated electrode 21 to be accessible from the outside. In the case where the target battery 10 is a lithium ion battery, the electrolyte solution is discharged from the cut portion.

In the deactivation step S2, part of lithium contained in the laminated electrode 21 or the like is turned into a lithium compound such as lithium hydroxide, which is soluble in water, by means of a known method such as immersion in water or showering. In the case where hydrogen sulfide is generated, the air should be taken, and neutralization should be performed. In the immersion step S3, water-soluble lithium hydroxide, solid electrolyte and the like are dissolved in water by immersing the laminated electrode 21 in water.

FIG. 3 schematically illustrates the states before and after the deactivation and immersion steps S2 and S3 in a case where the target battery 10 is a solid-state battery. As illustrated in FIG. 3, at least part of the solid electrolyte and elemental lithium can be separated through the deactivation and immersion steps S2 and S3, which can prevent charge/discharge reactions. In the subsequent separation step S4, an electrical pulse is applied to the laminated electrode 21 to separate the laminated electrode 21.

This turns the laminated electrode 21 and the vicinity thereof into a non-dense state as illustrated in FIG. 3, in which the laminated electrode 21 lacks in continuity and thus the laminated electrode 21 is possibly not able to conduct electricity. For this reason, the application of the electrical pulse is performed after a step of electrically connecting the electrode plates 11 and 12 of the laminated electrode 21, that is, a step of short-circuiting the electrode plates 11 and 12 by penetration of a predetermined electrical connection member 51 into the laminated electrode 21 in the separation step S4, as illustrated in FIG. 4.

FIG. 4 illustrates an example where a pointed metal rod material is employed as the predetermined electrical connection member 51, and a plurality of electrical connection members 51 spaced apart in the longitudinal direction of the electrode plates 11 and 12 penetrate the laminated electrode 21 from the outside of the laminate materials 22. This allows for electrical connection between the electrode plates 11 and 12 simply and in a short time while the laminated electrode 21 is kept covered by the laminate materials 22. In addition, the electrode plates 11 and 12 are electrically connected at a plurality of points, which can provide electrical connection paths suitable for causing a short-circuit between the electrode plates 11 and 12.

Note that it is preferable to provide a space S for physically separating the electrical connection member 51 from the laminate material 22 in order to prevent electrical connection between the electrical connection member 51 and the laminate material 22.

FIG. 5 schematically illustrates a state where an electrical pulse is applied in the separation step S4.

As illustrated in FIG. 5, an electrical pulse application device 55 is connected to the pair of current collector tabs 23A and 23B of the target battery 10. The electrical pulse application device 55 applies a high-voltage electrical pulse between the pair of current collector tabs 23A and 23B, thereby applying an electrical pulse to each of the electrode plates 11 and 12 of the laminated electrode 21. The electrical pulse generates Joule heat, which causes each component to dissolve, with which the electrode plates 11 and 12 and residues of the laminated electrode 21 can be separated. In this case, the positive electrode composite 32 being a high-resistance portion tends to reach a high temperature, and thus the residual positive electrode composite 32 can be readily separated.

As described above, the laminated electrode 21 can be separated simply and in a short time by applying an electrical pulse via the pair of current collector tabs 23A and 23B and by using the electrical pulse.

In the case where aluminum foil serves as the positive electrode current collector 31 and copper foil serves as the negative electrode current collector 41, for example, energization thereto with the laminated electrode 21 penetrated by a plurality of electrical connection members 51 as illustrated in FIG. 4 causes relatively greater energization to the copper foil because copper is greater in electric conductivity than aluminum foil. The aluminum foil may be therefore less energized, and efficiency in separation of the positive electrode current collector 31 may be lowered than originally intended.

Figure 6:
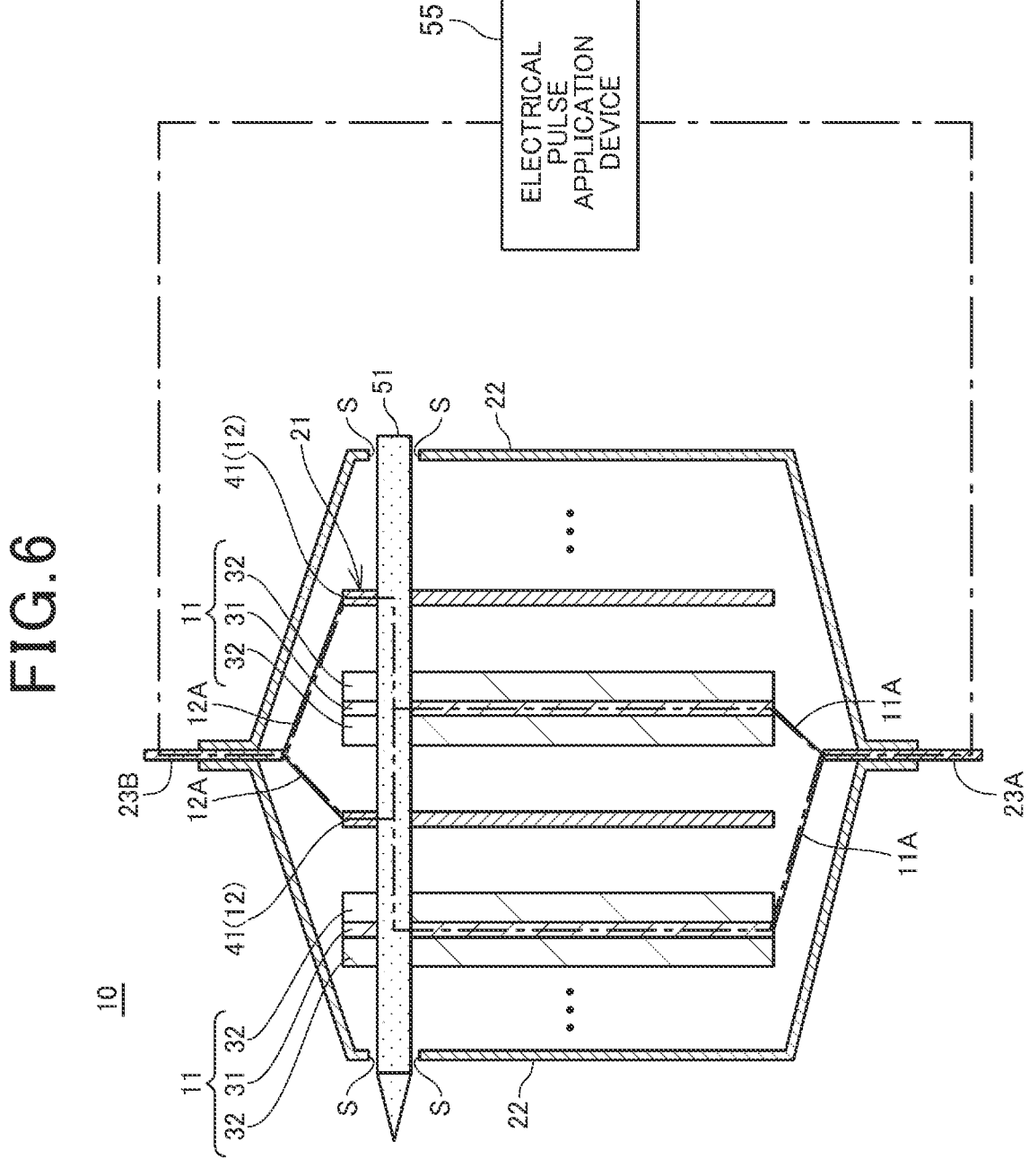
FIG. 6 is a diagram schematically illustrating another example of a state where an electrical pulse is applied in the separation step.

In this case, the laminated electrode 21 may be penetrated by one electrical connection member 51 in a region near the negative electrode side current collector tab 23B as illustrated in FIG. 6 to apply a high-voltage electrical pulse between the pair of current collector tabs 23A and 23B. This allows the electrical pulse to flow along the path shown by a dash-dotted line in FIG. 6.

Regarding the path along which the electrical pulse flows, the negative electrode current collector 41 has a partial energization path (corresponding to the portion from the negative electrode side current collector tab 23B to the electrical connection member 51), while the positive electrode current collector 31 has the most energization path (corresponding to the portion to the electrical connection member 51 from the positive electrode side current collector tab 23A). This allows for more energization to the positive electrode current collector 31 than to the negative electrode current collector 41, and high efficiency in separation of the positive electrode current collector 31 can be achieved even in the case where the negative electrode current collector 41 is greater in electric conductivity than the positive electrode current collector 31.

That is, according to the configuration described above, the target battery 10 has the negative electrode side current collector tab 23B being disposed on an opposite side of the laminated electrode 21 from the positive electrode side current collector tab 23A, and the electrical pulse is applied to the laminated electrode 21 via the positive electrode side current collector tab 23A and the negative electrode side current collector tab 23B with the laminated electrode 21 of the target battery 10 penetrated by the electrical connection member 51 in a region near the negative electrode side current collector tab 23B, allowing more energization to the positive electrode current collector 31 than to the negative electrode current collector 41, and high efficiency in separation of the positive electrode current collector 31 can be achieved even in the case where the negative electrode current collector 41 is greater in electric conductivity than the positive electrode current collector 31.

As described above, lithium is deactivated before the immersion step S3 of immersing the laminated electrode 21 in water according to the present embodiment, and therefore a reaction between lithium and water can be prevented and water-soluble lithium hydroxide, solid electrolyte and the like can be dissolved in water. The immersion step S3 is followed by the separation step S4 of separating the laminated electrode 21 by applying an electrical pulse to the laminated electrode 21, which allows the laminated electrode 21 to be separated simply and in a short time.

This allows the laminated electrode 21 to be separated simply and in a short time, in comparison to the conventional crushing method or the method of separating the electrode plates 11 and 12 by means of relative movement.

The electrical pulse is applied to the laminated electrode 21 after the electrode plates 11 and 12 of the laminated electrode 21 are brought into the electrically connected state in separation step S4, which allows for application of an electrical pulse to all the electrode plates 11 and 12 and facilitates appropriate separation of the laminated electrode 21.

The electrode plates 11 and 12 of the laminated electrode 21 are brought into the electrically connected state by penetration of the predetermined electrical connection member 51 into the laminated electrode 21, which can bring the electrode plates 11 and 12 into the electrically connected state simply and in a short time. Furthermore, the electrode plates 11 and 12 can be brought into the electrically connected state without removal of the laminate material 22 of the laminated electrode 21.

Note that the electrical connection member 51 is not limited to the pointed metal rod material as illustrated in FIG. 4. For example, a stapler, which drives a U-shaped staple into the laminated electrode 21, or the like may be used to bring the electrode plates 11 and 12 into the electrically connected state.

As illustrated in FIG. 6, the target battery 10 has the negative electrode side current collector tab 23B being disposed on an opposite side of the laminated electrode 21 from the positive electrode side current collector tab 23A, and the electrical pulse is applied to the laminated electrode 21 via the positive electrode side current collector tab 23A and the negative electrode side current collector tab 23B with the laminated electrode 21 penetrated by the electrical connection member 51 in a region near the negative electrode side current collector tab 23B. This achieves greater energization to the positive electrode current collector 31 than to the negative electrode current collector 41, which achieves high efficiency in separation of the positive electrode current collector 31 even in the case where the negative electrode current collector 41 is greater in electric conductivity than the positive electrode current collector 31.

The position or the number of electrical connection members 51 may be appropriately changed in a range where a sufficient efficiency of separating the positive electrode current collector 31 can be achieved, or the disposition of the electrical connection members 51 illustrated in FIG. 3 may be employed.

The target battery 10 is a laminated battery having the laminated electrode 21 covered with the laminate materials 22 with the pair of current collector tabs 23A and 23B being exposed outside of the laminate materials 22, and the electrical pulse is applied to the laminated electrode 21 via the pair of current collector tabs 23A and 23B. With this, the electrical pulse application device 55 and the laminated electrode 21 can be electrically connected simply. In addition, an electrical pulse can be applied to the laminated electrode 21 without removal of the laminate material 22.

In the case where the target battery 10 includes an electrolyte solution, the immersion step S3 is performed after the electrolyte solution is removed, lithium is deactivated and an electrolyte is removed, and therefore a reaction between lithium and water can be sufficiently prevented. In the case where the target battery 10 is a laminated battery, the electrolyte solution can be readily removed by partially cutting the laminate materials 22 to discharge the electrolyte solution. By immersing the laminated battery in a treatment liquid (for example, salt water) after the removal of the electrolyte solution, the treatment liquid is allowed to enter inside the laminate from the cut portion to deactivate lithium and remove the electrolyte, which operation can be easily performed.

The above embodiment is merely one aspect of the present invention, and may be appropriately modified or applied within the scope of the present invention.

For example, although the deactivation step S2, the immersion step S3, and the separation step S4 are performed without removal of the laminate material 22 according to the above embodiment, any of the deactivation step S2, the immersion step S3, and the separation step S4 may be performed with the laminate material 22 removed.

Although the electrode plates 11 and 12 are brought into the electrically connected state by penetration of the electrical connection member 51 into the laminated electrode 21 as an example according to the above embodiment, any method may be employed for bringing the electrode plates 11 and 12 into the electrically connected state. For example, an electrical connection member that does not penetrate the laminated electrode 21 may be employed to bring the electrode plates 11 and 12 into the electrically connected state.

Although the battery treatment method of the present invention is applied to a laminated lithium ion battery and a laminated solid-state battery according to the above embodiment, it is not restrictive. That is, the battery treatment method of the present invention may be applied to non-laminated lithium ion batteries and solid-state batteries.

Configurations Supported by the Above Embodiment

The above embodiment supports the following configurations.

(Configuration 1) A method of treating a battery having a laminated electrode that includes a positive electrode plate and a negative electrode plate with a separator interposed between the positive electrode plate and the negative electrode plate, the battery being either a lithium ion battery or a solid-state battery, the method including: an immersion step of immersing the laminated electrode in water after lithium is deactivated; and a separation step of separating the laminated electrode by applying an electrical pulse to the laminated electrode.

This method allows the laminated electrode to be separated simply and in a short time.

(Configuration 2) The battery treatment method according to the configuration 1, in which the electrical pulse is applied to the laminated electrode after the electrode plates of the laminated electrode are brought into an electrically connected state in the separation step.

This method allows for application of the electrical pulse to all the electrode plates and facilitates appropriate separation of the laminated electrode.

(Configuration 3) The battery treatment method according to the configuration 2, in which the electrode plates of the laminated electrode are brought into the electrically connected state by penetration of a predetermined electrical connection member into the laminated electrode in the separation step.

With this method, the electrode plates can be brought into the electrically connected state simply and in a short time. Furthermore, the electrode plates can be brought into the electrically connected state without removal of the outer cover of the laminated electrode.

(Configuration 4) The battery treatment method according to the configuration 3, in which the battery includes a positive electrode side current collector tab connected with the positive electrode plate and a negative electrode side current collector tab connected with the negative electrode plate, the negative electrode side current collector tab being disposed on an opposite side of the laminated electrode from the positive electrode side current collector tab, and the electrical pulse is applied to the laminated electrode via the positive electrode side current collector tab and the negative electrode side current collector tab with the laminated electrode penetrated by the electrical connection member in a region near the negative electrode side current collector tab.

This method achieves greater energization to the positive electrode current collector than to the negative electrode current collector, which achieves high efficiency in separation of the positive electrode current collector even in the case where the negative electrode current collector is greater in electric conductivity than the positive electrode current collector.

(Configuration 5) The battery treatment method according to any one of the configurations 1 to 4, in which the battery is a laminated battery having the laminated electrode covered with a laminate material with a pair of current collector tabs being exposed outside of the laminate material, and the electrical pulse is applied to the laminated electrode via the pair of current collector tabs.

With this method, an electrical pulse application device and the laminated electrode can be electrically connected simply, and the electrical pulse can be applied to the laminated electrode without removal of the laminate material.

(Configuration 6) The battery treatment method according to any one of the configurations 1 to 4, in which in a case where the battery has an electrolyte solution, the immersion step is performed after the electrolyte solution is removed, lithium is deactivated and an electrolyte is removed.

With this method, a reaction between lithium and water can be sufficiently prevented. In the case where the target battery is a laminated battery, the laminate material is partially cut to discharge the electrolyte solution and subsequently the laminated battery is immersed in a treatment liquid, which allows the treatment liquid to enter inside the laminate from the cut portion to deactivate lithium and remove the electrolyte, which operation can be easily performed.

REFERENCE SIGNS LIST

10 . . . Target battery, 11 . . . Positive electrode plate, 12 . . . Negative electrode plate, 13 . . . Separator, 21 . . . Laminated electrode, 22 . . . Laminate material, 22A, 22B . . . Current collector tab, 31 . . . Positive electrode current collector, 32 . . . Positive electrode composite, 41 . . . Negative electrode current collector, 42 . . . Negative electrode composite, 51 . . . Electrical connection member, 55 . . . Electrical pulse application device

What is claimed is:

1. A method of treating a battery having a laminated electrode that includes a positive electrode plate and a negative electrode plate with a separator interposed between the positive electrode plate and the negative electrode plate, the battery being either a lithium ion battery or a solid-state battery, the method comprising:

an immersion step of immersing the laminated electrode in water after lithium is deactivated; and a separation step of separating the laminated electrode by applying an electrical pulse to the laminated electrode, wherein the electrical pulse is applied to the laminated electrode after the electrode plates of the laminated electrode are brought into an electrically connected state in the separation step, the electrode plates of the laminated electrode are brought into the electrically connected state by penetration of a predetermined electrical connection member into the laminated electrode in the separation step, the battery includes a positive electrode side current collector tab connected with the positive electrode plate and a negative electrode side current collector tab connected with the negative electrode plate, the negative electrode side current collector tab being disposed on an opposite side of the laminated electrode from the positive electrode side current collector tab, and the electrical pulse is applied to the laminated electrode via the positive electrode side current collector tab and the negative electrode side current collector tab with the laminated electrode penetrated by the electrical connection member in a region near the negative electrode side current collector tab.

2. A method of treating a battery having a laminated electrode that includes a positive electrode plate and a negative electrode plate with a separator interposed between the positive electrode plate and the negative electrode plate, the battery being either a lithium ion battery or a solid-state battery, the method comprising:

an immersion step of immersing the laminated electrode in water after lithium is deactivated; and a separation step of separating the laminated electrode by applying an electrical pulse to the laminated electrode, wherein the battery is a laminated battery having the laminated electrode covered with a laminate material with a pair of current collector tabs being exposed outside of the laminate material, and the electrical pulse is applied to the laminated electrode via the pair of current collector tabs.

* * * * *